April 10, 1973   J. P. THOREL ET AL   3,726,761
NUCLEAR REACTOR CORE CLAMPING SYSTEM
Filed May 14, 1970   3 Sheets-Sheet 3

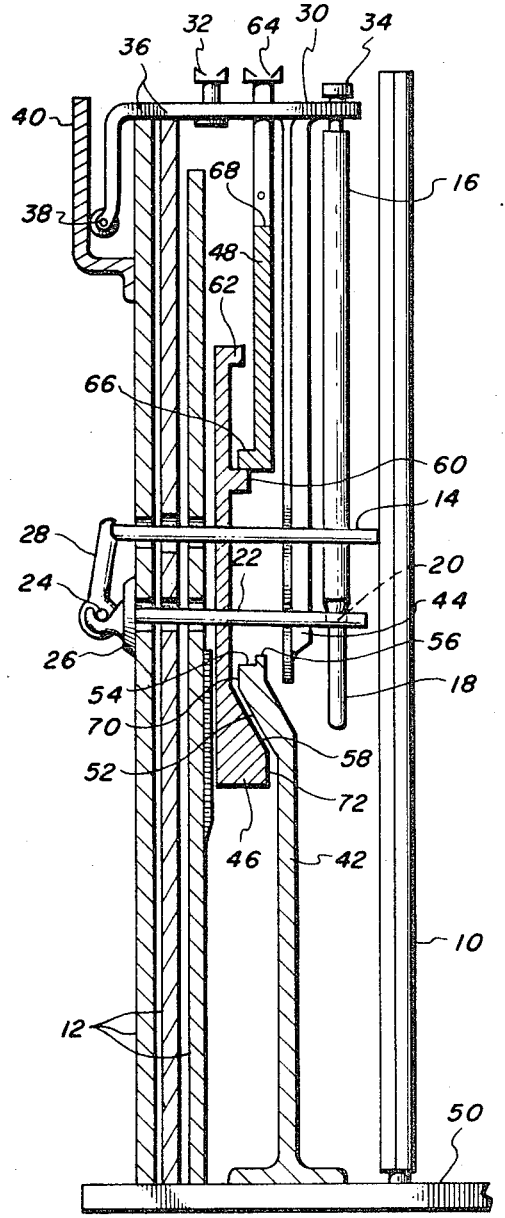
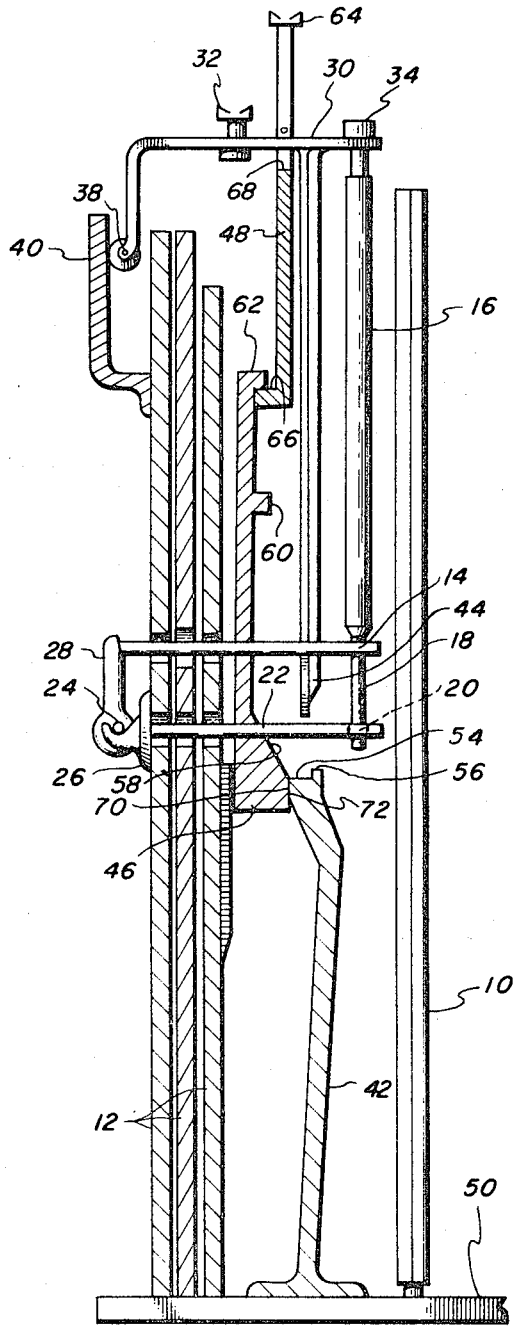
FIG. 1
FIG. 2

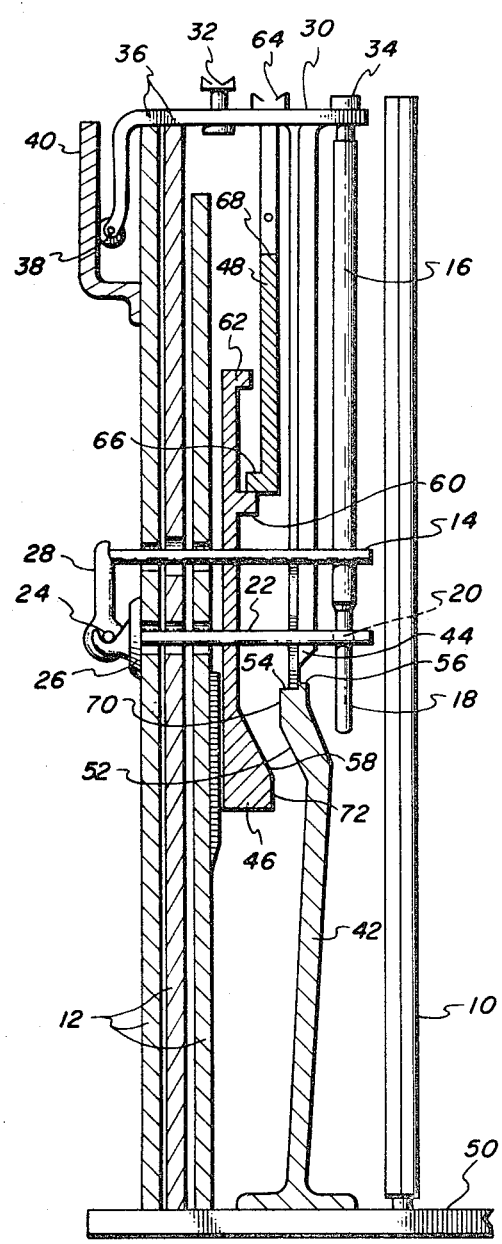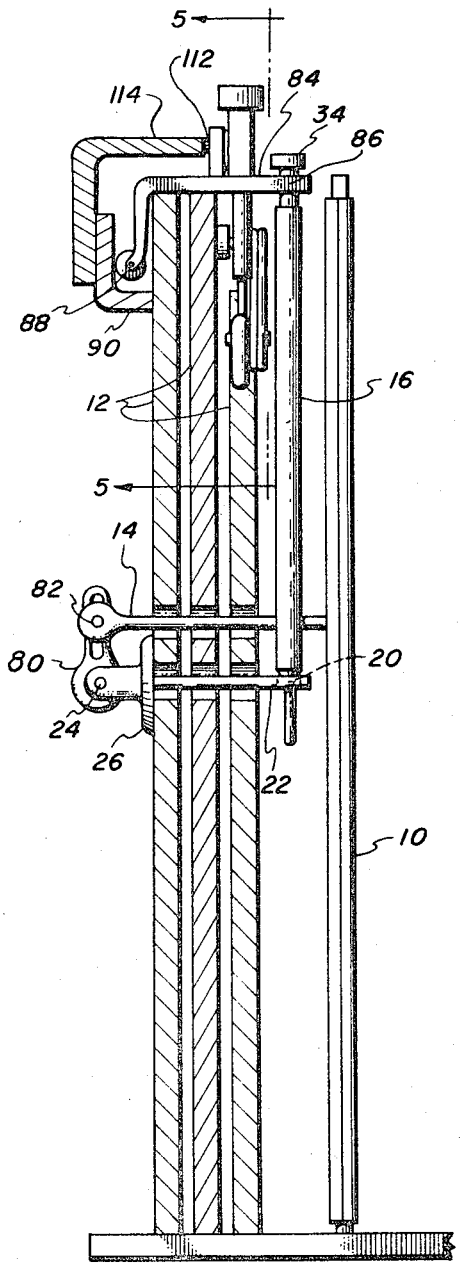

INVENTORS.
JOHN P. THOREL
WILLIAM F. ANDERSON
BY Robert M. Davidson
ATTORNEY 3,726,761
NUCLEAR REACTOR CORE CLAMPING SYSTEM
John P. Thorel, Northridge, and William F. Anderson, Westlake Village, Calif., assignors to North American Rockwell Corporation
Filed May 14, 1970, Ser. No. 37,079
Int. Cl. G21c 19/00
U.S. Cl. 176—87                 6 Claims

ABSTRACT OF THE DISCLOSURE

A clamping device for nuclear reactor cores wherein the force of gravity, acting upon weights and through a mechanical linkage, is made to exert a radial inwardly directed force of constant magnitude on the reactor core. Cams or mechanical supporting members are used to hold the weight in an upward position when a clamping force is not desired as for example during refueling.

BACKGROUND OF THE INVENTION

(A) Field of the invention

This invention relates to the field of nuclear reactors, and more particularly to methods and means for maintaining structural integrity within the core region of nuclear reactors. Still further, this invention relates to methods and means for clamping the cores of nuclear reactors.

In the operation of nuclear reactors a temperature gradient is built up within the core region with the highest temperature at the center of the core. Fuel elements placed within the gradient tend to bow convexly away from the center of the core because the hot side of the fuel element expands to a greater extent than the cooler side. This action, known as thermal bowing, has detrimental effects upon core geometry, coolant flow, and control of the nuclear reaction.

Another factor which must be considered in the design of nuclear reactor cores, especially in cores designed for elevated neutron fluences, is the swelling of the structural materials subjected to fast irradiation. Experiments have shown that structural materials such as austenitic stainless steel develop internal voids under fast neutron irradiation which are responsible for the swelling observed. The swelling of core components creates expansion pressures within the core compounding the detrimental effects of thermal expansion in a similar outwardly direction.

Other possible disruptions of core integrity involve displacements due to stress relaxation and vibrations caused by the flow of coolant through the core.

Since the maintenance of structural integrity within the core of nuclear reactors is vital, there is great need for methods and means for achieving integrity at all operating conditions.

(B) Description of the prior art

Various core clamping systems have been proposed whereby an external force is exerted on the core of the reactor to assure constant geometry. Many of these proposals involve the use of core expansion energy to create a clamping force. While expansion energy is an efficient source of clamping force, control of such forces is most difficult. It is not possible for example to "turn-off" the clamping force in a hot reactor or one in which the expansion force used creates clamping force caused by neutron-induced swelling. Yet, relief of clamping forces is necessary for intermittent fuel handling.

Thus there remains in the art a need for improved methods and means directed to maintaining the structural integrity of nuclear reactor cores.

SUMMARY OF THE INVENTION

We have discovered a novel means for maintaining the integrity of nuclear reactor cores using a core clamp that derives its motive force from suspended weights and which may be released to facilitate fuel handling.

Accordingly, the objects of the present invention are:
to provide an improved form of core restraint for nuclear reactors,
to provide an improved core clamping means for nuclear reactors, and
to provide an improved core clamping means for fast nuclear reactors;
to provide an improved core clamping means capable of producing a constant clamping force.

These and other objects, advantages and features of the invention will become more apparent upon consideration of the following description of preferred embodiments wherein reference is made to the attached drawings.

BRIEF DESCRIPTION OF THE DRAWINGS

FIG. 1 is a vertical sectional view of a preferred embodiment of the invention in the clamping position.

FIG. 2 is a vertical sectional view of the embodiment shown in FIG. 1 in an intermediary position.

FIG. 3 is a vertical sectional view of the embodiment shown in FIG. 1 in a non-clamping position.

FIG. 4 is a vertical sectional view of a second preferred embodiment.

DESCRIPTION OF THE PREFERRED EMBODIMENTS

Figure 6:
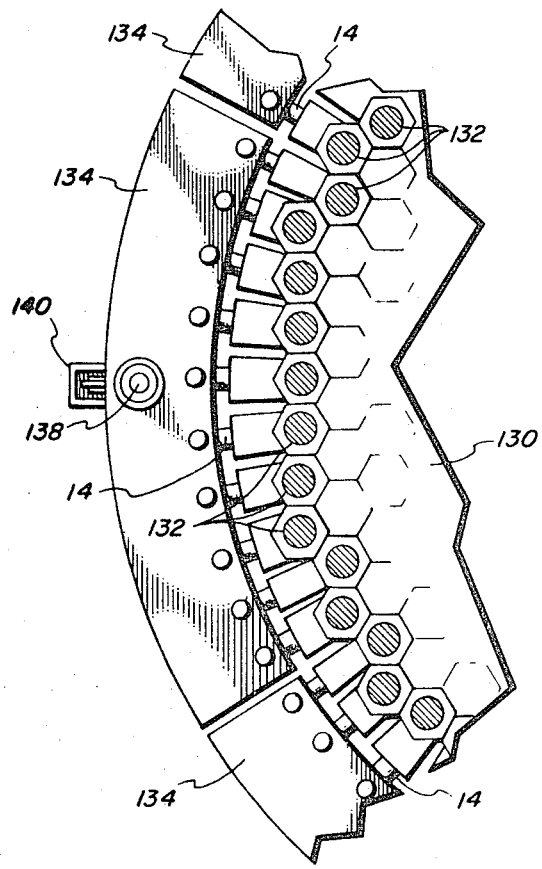
FIG. 6 is a schematic illustration showing the placement of the clamping devices around the core of a nuclear reactor.

The clamping system of this invention is particularly adapted for use with fast neutron reactors, as for example fast breeder reactors. When used therewith the clamping system will be located between the reflector elements and the neutron shield or it can be made part of the shield. In this connection, reference is made to FIG. 1 wherein 10 represents a core reflector element. The location of the reflector with respect to the core is shown in FIG. 6. Neutron shielding 12 is external to the reflector elements. The main portion of our clamping means is positioned intermediate reflector elements 10 and neutron shielding and flux gradients it is necessary to establish an inwardly directed force at a position intermediate the upper and 12.

In order to limit the extent of bowing due to thermal lower ends of reflector element 10. The location of this position is known as the clamping plane. FIG. 1 shows the clamping forces applied by thrust arm 14 as it bears directly upon reflector element 10.

The power for the clamping effort is derived from the force of gravity acting upon weight member 16. This weight member has associated therewith at its lower end a portion 18 having a reduced diameter. This portion of weight 16 is made to pass through a hole 20 in a receiving lever arm 22. The remainder of weight member 16 however will not pass through hole 20 and thus in a clamping mode, the weight of member 16 is brought to bear upon arm 22. The opposite end of lever arm 22 is rigidly connected to shaft 24 and the arm passes through neutron shielding wall 12 and collar means 26. A second lever arm 28 is also rigidly connected to shaft 24. In turn, lever arm 28 transmits the forces to thrust arm 14.

From time to time, it is necessary to relieve the clamping forces for the purpose of refueling or inspection. Thus, there is provided means to lift and hold member 16 so that its weight is no longer supported by arm 22. The lifting mechanism includes lifting plate 30 having attached thereto a lifting pin or collar 32. Weight member 16 is attached to lifting plate 30 by pin member 34. A portion of plate 30 passes through slots 36 and shield walls 12 and then is bent downwardly having at its end a bearing means 38. This bearing means is slidably mounted against support member 40. Although lifting plate 30 is able to release the weight from lever arm 22 and then relieve the clamping force, it is desirable to provide a means whereby the device may be set in a semipermanent unclamped position. A group of elements which cooperate to switch the device from a clamped mode to an unclamped mode is provided. This group includes a lower support member 42, an upper support member 44, cocking member 46 and guide member 48. Lower support member 42 is fastened at its lower end to bottom plate 50. As shown in FIGS. 1 through 3, member 42 extends upwardly from plate 50 and has adjacent its upper end, a cammed surface 52. Its upper end also includes a vertical surface 70, a horizontal surface 54, and ledge portion 56. The upper support member 44 is a vertically hung member extending downwardly from lifting plate 30. Cocking member 46 is positioned adjacent to lower support member 42 intermediate said lower support member 42 and neutron shielding 12. The lower portion of cocking member 46 includes a cammed surface 58 which is parallel to the cam surface of member 42 and vertical surface 72 which is similarly parallel to vertical surface 70 of lower support member 42. The upper portion of cocking member 46 is seen as having two inwardly extending lip portions 60 and 62. Guide member 48 has at its upper end a coupling 64 to which a lifting force may be applied. At its lower end, member 48 has attached a lip portion 66 which is positioned to engage lip portions 60 and 62 of member 46 depending upon the relative movements of members 46 and 48. Guide member 48 is slidably mounted through lifting plate 30 from coupling 64 to shoulder 68.

FIGS. 1, 2 and 3 illustrate the operation of these elements. In FIG. 1, the device is in the clamped position with weight member 16 resting on lever arm 22. To remove the clamping force, member 48 is lifted upwardly by the action of the fuel handling machine or other lifting device on coupling 64. This action lifts member 48 exclusively until lip portion 66 reaches lip 62 and shoulder portion 68 reaches lifting plate 30. Continued lifting of member 48 causes member 46 to rise bringing camming surfaces 58 and 52 together and thus forcing member 42 to deflect. At the same time, lifting plate 30 is moved upwards thereby lifting member 44 and weight 16. FIG. 2 illustrates the arrangement of the various elements when member 48 is lifted to a maximum. At that point, member 42 is deflected to its maximum extent and vertical surfaces 70 of member 42 and 72 of member 46 are brought to rest against each other.

To place the device in a holding position, a downward force is exerted on coupling 32 causing members 44, 48 and weight 16 to move downwardly. Member 46 does not move at this time because of the spring force of member 42. Lifting plate 30 is pushed down until upper member 44 is set in engagement with lower member 42. After members 42 and 44 are engaged, member 48 is pushed down forcing member 46 down as shown in FIG. 3, and placing the device in a hold or unclamped position.

To remove the device from the hold position of FIG. 3, and to return it to the clamping position of FIG. 1, a lifting force is applied to coupling 32 causing lifting plate 30, member 44 and weight 16 to rise. As member 44 is lifted, member 42 springs back to its original position. The device can then be returned to the clamping position as shown in FIG. 1 by allowing lifting plate 30 to move downwardly until weight 16 rests upon lever arm 22.

Figure 5:
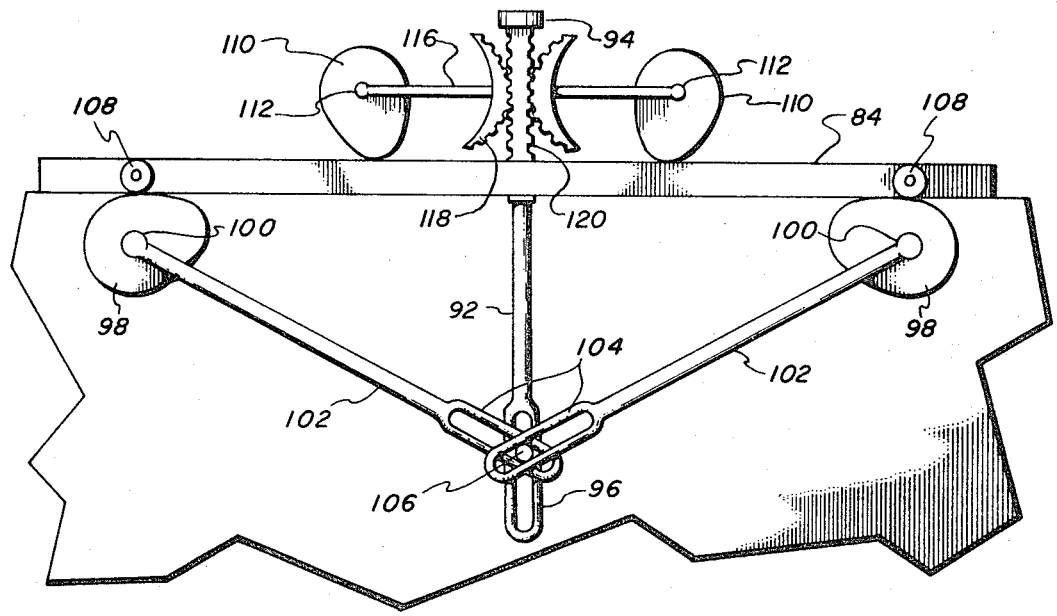
FIG. 5 is a sectional view taken along line 5—5 of FIG. 4.

A second embodiment of our invention is shown in FIGS. 4 and 5. This embodiment is related to the one previously described in that in each case a weight is used to create a force upon a lever arm which is transmitted through a thrust arm to a reflector element. FIG. 4 shows a clamping device having a weight member 16 situated between reflector element 10 and shield portions 12. A lever mechanism for transmitting forces from weight 16 to thrust arm 14 which is equivalent to the lever mechanism of FIGS. 1 through 3 is shown. This assembly consists of arm 22 upon which weight 16 rests, collar 26, shaft 24, slotted lever arm 80, pin 82 and thrust arm 14. The operation of this assembly is essentially the same as in the first embodiment with the exception that thrust arm 14 is slidably mounted in lever arm 80.

The lifting mechanism comprises a lifting plate 84 having a slot 86 through which pin 34 is placed for the attachment of weight members 16. Lifting plate 84 is bent downwardly at its outer edge and has fixed at its lower end a bearing means 88 which is slidably mounted against guide member 90 which in turn is attached to outer shield element 12.

A group of cams is provided for the purpose of lifting weight member 16 and holding it in a position where it does not assert a clamping force. FIG. 5 which is a sectional view along line 5—5 of FIG. 4 shows the cam arrangements. In that figure, 92 represents a lifting link which is slidably mounted through plate 84 and has attached thereto a lifting coupling 94 at its upper end and a slotted portion 96 at its lower end. Two lifting cams 98 which are connected to rotatable shafts 100 provide the lifting force necessary to lift plate 84 and weight member 16. Shafts 100 are rotatably mounted to inner shielding 12 as shown in FIG. 4. The shaft portion of cams 98 has attached thereto lever arms 102 having slots 104. A pin 106 is placed through slots 104 of arms 102 and slot 96 of lifting link 92. This linkage allows a lifting force on link 92 to be transmitted through lever arms 102 to cams 98. Cams 98 are positioned against rollers 108 which are attached to lifting plate 84 and which act as cam followers.

A second group of cams 110 is positioned above lifting plate 84. These cams turn on shafts 112 which are rotatably mounted to plate 114. Plate 114 is rigidly attached to guide member 80. Lever arms 116 are rigidly attached to shafts 112 so that they rotate in cooperation with cams 110. These shafts have attached at their ends geared rocker portions 118. These geared rocker portions mesh with gear strips 120 positioned along lifting link 92. The purpose of cams 110 is to assure complete resetting of lifting plate 84.

In operation, weight member 16 is lifted by the application of a lifting force on coupling 94 of lifting link 92. This causes link 92 to rise thereby rotating resetting cams 110 inwardly and thus raising them from the surface of lifting plate 84. As link 92 is further lifted the slotted portion 96 of link 92 applies a force upon pin 106 causing upward movement of lever arms 102. This upward movement of lever arms 102 rotates cams 98 and moves plate 84 upwardly. In lifting the plate, cams 98 are turned past "center" so that when the lifting force on coupling 94 is relaxed lifting plate 84 and attached member 16 are held in up position.

To return the device to a clamping position, a downward force is applied to coupling 94 sufficient to cause cams 98 to pass over "center" and then to cause a lowering of lifting plate 84. When the lifting cams 98 are in their lowest position, resetting cams 110 are turned by gears 118 and 120 to apply a positive downward force on lifting plate 84 assuring the correct positioning of the plate for the application of a clamping force by weight member 16.

In either embodiment it is the force of gravity acting upon a series of levers which provides the energy for clamping. The clamping devices are positioned around the reactor core as shown in FIG. 6. There 130 represents the core region of a nuclear reactor. The outside row of elements 132 is composed of reflector elements. Thrust arms 14 are formed to match the shape of reflector elements 132. A single lifting plate 134 is used to control a plurality of thrust arms 14 each having an associated weight (not shown) attached to lifting plates 134 by pins 34. The number of weights controlled by lifting plates 134 is not a critical feature. However, it is more practical to allow a single lifting plate 134 to control a plurality of plates rather than only one weight. FIG. 6 shows only one lifting coupling 138 and one guide channel 140 per lifting plate although there can be more than one per plate.

The invention has been described with reference to preferred embodiments and preferred modifications. However, it will be apparent to those skilled in the art that other modifications and adaptations of the clamping device are possible without departing from the spirit and scope of the invention defined by the claims below.

We claim:

1. A clamping system for nuclear reactor cores having a hexagonal cluster of vertically aligned elements including a row of peripheral elements, said system comprising vertically-oriented weight means, means including a pair of interconnected generally horizontal lever arms to convert the force of gravity acting on said weight means into a generally horizontal clamping force directed against said peripheral elements when said weight is in a down position and means to lift said weight from said down position.

2. The invention as set forth in claim 1 further comprising means to hold said weight in a position other than said down position and means to place said weight in a down position from said hold position.

3. The clamping system of claim 5 wherein said means to hold includes elements (42), (44), (46), and (48).

4. The invention as set forth in claim 2 wherein said means to hold includes a substantially vertically aligned ledge member positionable under a vertically aligned holding member, said holding member being connected to a lift means, said lift means serving to position said weight means into and out of clamping engagement against said peripheral elements, said lift means additionally having a vertically aligned forcing member associated therewith, said forcing member when said lift means is moved upwardly adapted to force said ledge member under said holding member, whereby when said lift means is moved downwardly said holding member engages said ledge member thereby holding said weight member in a position other than said down position.

5. The invention as set forth in claim 2 wherein said means to convert the force of gravity acting on said weight means into a generally horizontal clamping force comprises a lift plate connected to said vertically oriented weight means, said weight means being guided into engagement by said lift plate with one of said pair of interconnected generally horizontal lever arms, means in one of said lever arms forming an aperture to accept an end of said weight means, said weight means having a shoulder portion that engages a peripheral edge surrounding said aperture in said lever arm when said clamping system is in a clamping mode, said shoulder portion transferring said force of gravity horizontally outwardly through said lever arm through a pivot means connected to a fixed shielding wall and inwardly back through the other of said pair of lever arms, the end of said other lever arm engaging said peripheral elements with radially inwardly directed clamping force.

6. A clamping system for nuclear reactor cores having a hexagonal cluster of vertically aligned elements including a row of peripheral elements, said system comprising weight means, means to convert the force of gravity acting on said weight means into a generally horizontal clamping force directed against said peripheral elements when said weight is in a down position, means to lift said weight from said down position, means to hold said weight in a position other than said down position wherein said means to hold includes cam means disposed beneath a lifting plate means, said lifting plate means having attached thereto said weight means.

References Cited

FOREIGN PATENTS

| | | | |
|---|---|---|---|
| 888,307 | 1/1962 | Great Britain | 176—85 |
| 889,636 | 2/1962 | Great Britain | 176—85 |
| 1,137,809 | 10/1962 | Germany | 176—85 |

REUBEN EPSTEIN, Primary Examiner

U.S. Cl. X.R.

176—85; 292—185

PO-1050
(5/69)

UNITED STATES PATENT OFFICE
CERTIFICATE OF CORRECTION

Patent No. 3,726,761　　　　　　　Dated　April 10, 1973

Inventor(s) J. P. Thorel et al

It is certified that error appears in the above-identified patent and that said Letters Patent are hereby corrected as shown below:

Column 2, lines 46-49, cancel and replace with --12.
In order to limit the extent of bowing due to thermal and flux gradients it is necessary to establish an inwardly directed force at a position intermediate the upper and--.
Column 4, line 39, "80" should read --90--.

Signed and sealed this 15th day of January 1974.

(SEAL)
Attest:

EDWARD M. FLETCHER, JR.　　　　RENE D. TEGTMEYER
Attesting Officer　　　　　　　Acting Commissioner of Patents